(12) United States Patent
Shiraogawa et al.

(10) Patent No.: US 7,777,836 B2
(45) Date of Patent: Aug. 17, 2010

(54) LIQUID CRYSTAL PANEL AND LIQUID CRYSTAL DISPLAY APPARATUS

(75) Inventors: Miki Shiraogawa, Osaka (JP); Junichi Inagaki, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 303 days.

(21) Appl. No.: 12/065,398

(22) PCT Filed: Apr. 5, 2007

(86) PCT No.: PCT/JP2007/057633

§ 371 (c)(1),
(2), (4) Date: Feb. 29, 2008

(87) PCT Pub. No.: WO2007/129516

PCT Pub. Date: Nov. 15, 2007

(65) Prior Publication Data

US 2009/0231517 A1    Sep. 17, 2009

(30) Foreign Application Priority Data

May 9, 2006 (JP) ............................ 2006-129899
Sep. 12, 2006 (JP) ............................ 2006-246612

(51) Int. Cl.
G02F 1/1347 (2006.01)
G02F 1/1335 (2006.01)

(52) U.S. Cl. .................................. 349/75; 349/121
(58) Field of Classification Search .................. None
See application file for complete search history.

(56) References Cited

U.S. PATENT DOCUMENTS 6,831,722 B2 * 12/2004 Ishikawa et al. ............ 349/117
(Continued)

FOREIGN PATENT DOCUMENTS

CN    1646976 A    7/2005

(Continued)

OTHER PUBLICATIONS

International Search Report of PCT/JP2007/057633, date of mailing Jun. 26, 2007.

*Primary Examiner*—Tina M Wong
(74) *Attorney, Agent, or Firm*—Westerman, Hattori, Daniels & Adrian, LLP

(57) ABSTRACT

There is provided a liquid crystal display apparatus having a high contrast ratio in an oblique direction and small color change depending upon a viewing angle.

A liquid crystal panel according to an embodiment of the present invention includes: a liquid crystal cell; a first polarizer placed on one side of the liquid crystal cell; a second polarizer placed on the other side of the liquid crystal cell; a first O-plate placed between the liquid crystal cell and the first polarizer; a second O-plate placed between the liquid crystal cell and the second polarizer; a first biaxial retardation layer placed between the liquid crystal cell and the first O-plate; and a second biaxial retardation layer placed between the liquid crystal cell and the second O-plate. The first and the second O-plates are solidified layers or cured layers of a bar-shaped liquid crystal compound arranged in a hybrid alignment; and a tilt angle ($\theta_P$) of the bar-shaped liquid crystal compound on the polarizer side is larger than a tilt angle ($\theta_B$) thereof on the biaxial retardation layer side.

13 Claims, 7 Drawing Sheets

U.S. PATENT DOCUMENTS

| | | |
|---|---|---|
| 6,919,946 B2 | 7/2005 | Allen et al. |
| 7,088,411 B2 | 8/2006 | Allen et al. |
| 2003/0193636 A1 | 10/2003 | Allen et al. |
| 2003/0193637 A1 | 10/2003 | Mi et al. |
| 2004/0114078 A1 | 6/2004 | Ishikawa et al. |
| 2005/0083464 A1* | 4/2005 | Allen et al. ............ 349/121 |
| 2006/0221286 A1* | 10/2006 | Allen et al. ............ 349/121 |

FOREIGN PATENT DOCUMENTS

| | | |
|---|---|---|
| JP | 2000-356773 A | 12/2000 |
| JP | 2001-100031 A | 4/2001 |
| JP | 2002-250941 A | 9/2002 |
| JP | 2004-38148 A | 2/2004 |
| JP | 2004-199060 A | 7/2004 |
| JP | 2005-138375 A | 6/2005 |
| JP | 2005-202101 A | 7/2005 |
| KR | 2005-0013536 A | 2/2005 |
| WO | 03/089981 A1 | 10/2003 |

* cited by examiner

LIQUID CRYSTAL PANEL AND LIQUID CRYSTAL DISPLAY APPARATUS

TECHNICAL FIELD

The present invention relates to a liquid crystal display apparatus with a high contrast ratio in an oblique direction.

BACKGROUND ART

A liquid crystal display apparatus (hereinafter, referred to as an "LCD") is an element that displays characters and images using electrooptical properties of liquid crystal molecules. As one of the driving modes of the LCD, there is a twisted nematic (TN) mode. Conventionally, an LCD of a TN mode has a disadvantage in that a viewing angle is narrow in a vertical direction, and has a problem in that the clarity of characters and images are remarkably degraded when a screen is viewed in an oblique direction. In order to solve this problem, for example, a liquid crystal display apparatus using a so-called O-plate and a biaxial retardation layer has been proposed (e.g. see Patent Document 1). However, in the conventional liquid crystal display apparatus with a liquid crystal panel, the disadvantage in that a viewing angle is narrow in a vertical direction is not sufficiently overcome. Particularly in the applications such as measuring instruments of automobiles and ships, displays for exhibition, and commercial touch panel displays, for users with various heights, the improvement is particularly demanded.

Patent Document 1: JP 2001-100031 A

DISCLOSURE OF THE INVENTION

Problems to be Solved by the Invention

The present invention has been made in view of solving the conventional problems as described above, and it is an object of the present invention to provide a liquid crystal display apparatus having a high contrast ratio in an oblique direction and small color change depending upon a viewing angle.

Means for Solving the Problems

The present inventors have conducted intensive studies for solving the above problems, and have found that the above objects can be attained with the liquid crystal panel described below, to thereby complete the present invention.

A liquid crystal panel according to an embodiment of the present invention includes: a liquid crystal cell; a first polarizer placed on one side of the liquid crystal cell; a second polarizer placed on the other side of the liquid crystal cell; a first O-plate placed between the liquid crystal cell and the first polarizer; a second O-plate placed between the liquid crystal cell and the second polarizer; a first biaxial retardation layer placed between the liquid crystal cell and the first O-plate; and a second biaxial retardation layer placed between the liquid crystal cell and the second O-plate. The first and the second O-plates are solidified layers or cured layers of a bar-shaped liquid crystal compound arranged in a hybrid alignment; and a tilt angle ($\theta_P$) of the bar-shaped liquid crystal compound on the polarizer side is larger than a tilt angle ($\theta_B$) thereof on the biaxial retardation layer side.

In one embodiment of the invention, a difference ($\theta_P - \theta_B$) between the tilt angle ($\theta_P$) of the bar-shaped liquid crystal compound on the polarizer side and the tilt angle ($\theta_B$) thereof on the biaxial retardation layer side is 20° to 90°.

In another embodiment of the invention, the tilt angle ($\theta_P$) of the bar-shaped liquid crystal compound on the polarizer side is 20° to 90°.

In still another embodiment of the invention, the liquid crystal cell includes a liquid crystal layer, a first substrate placed on the liquid crystal layer on the first polarizer side, and a second substrate placed on the liquid crystal layer on the second polarizer side; and the first substrate and the second substrate respectively have an alignment film on the liquid crystal layer side.

In still another embodiment of the invention, the liquid crystal layer contains liquid crystal molecules arranged in a twist alignment in the absence of an electric field.

In still another embodiment of the invention, an absorption axis of the first polarizer is substantially perpendicular to an absorption axis of the second polarizer.

In still another embodiment of the invention, a slow axis of the first O-plate is substantially parallel to the absorption axis of the first polarizer, and a slow axis of the second O-plate is substantially parallel to the absorption axis of the second polarizer.

In still another embodiment of the invention, a direction in which a director direction of the bar-shaped liquid crystal compound is projected onto the liquid crystal cell surface is substantially the same as an alignment treatment direction of the liquid crystal cell.

In still another embodiment of the invention, in-plane retardation value (Re[590]) at a wavelength of 590 nm of the first O-plate and/or the second O-plate is 50 nm to 200 nm.

In still another embodiment of the invention, the slow axis of the first biaxial retardation layer is substantially perpendicular to the absorption axis of the first polarizer, and the slow axis of the second biaxial retardation layer is substantially perpendicular to the absorption axis of the second polarizer.

In still another embodiment of the invention, an in-plane retardation value (Re[590]) at a wavelength of 590 nm of the first biaxial retardation layer and/or the second biaxial retardation layer is 50 nm to 200 nm.

In still another embodiment of the invention, an Nz coefficient of the first biaxial retardation layer and/or the second biaxial retardation layer is 1.1 to 6.0.

In still another embodiment of the invention, the first biaxial retardation layer and/or the second biaxial retardation layer includes a retardation film containing norbornene-based resin.

According to another aspect of the present invention, a liquid crystal display apparatus is provided. The liquid crystal display apparatus includes the liquid crystal panel as described above.

Effects of the Invention

According to the present invention, owing to the synergistic effect of the combination of the optical properties and the arrangement of each retardation layer, it is possible to obtain a liquid crystal display apparatus which has a high contrast ratio in an oblique direction and has small color change depending upon a viewing angle. Particularly, it is possible to obtain a liquid crystal display apparatus which has a much higher contrast ratio compared with that of a conventional liquid crystal panel in the case where a screen is viewed in an oblique direction from a vertical azimuth of a display apparatus.

Figure 1:
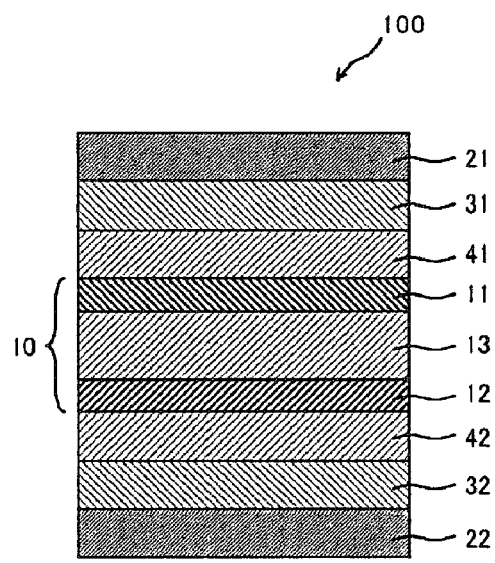
FIG. 1 Schematic cross-sectional view of a liquid crystal panel according to a preferred embodiment of the present invention.

DESCRIPTION OF REFERENCE NUMERALS 1,2 Alignment treatment (rubbing) direction
3,4 Absorption axis
5,6 Slow axis
7,8 Director direction
7',8' Alignment direction
10 Liquid crystal cell
11 First substrate
12 Second substrate
13 Liquid crystal layer
21 First polarizer
22 Second polarizer
31 First O-plate
32 Second O-plate
33 Bar-shaped liquid crystal compound
41 First biaxial retardation layer
42 Second biaxial retardation layer
80 Backlight unit
81 Light source
82 Reflective film
83 Diffusion plate
84 Prism sheet
85 Brightness enhancing film
100 Liquid crystal panel
200 Liquid crystal display apparatus

BEST MODE FOR CARRYING OUT THE INVENTION

A. Overview of a Liquid Crystal Panel of the Present Invention

Figure 2:
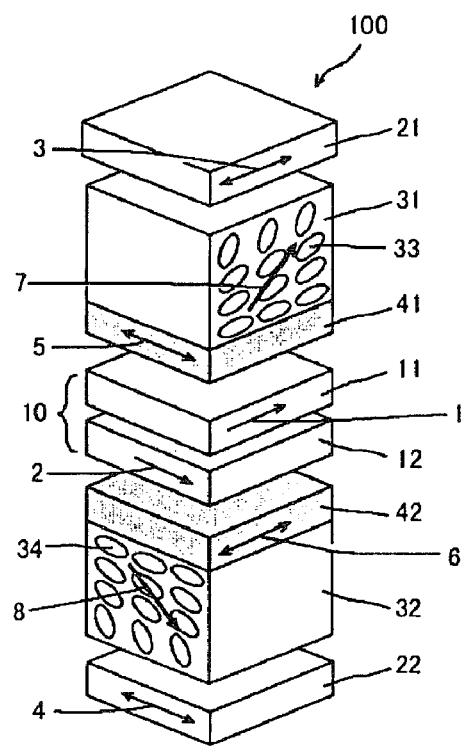
FIG. 2 Schematic perspective view of the liquid crystal panel of FIG. 1.

FIG. 1 is a schematic sectional view of a liquid crystal panel according to the present invention. FIG. 2 is a schematic perspective view of the liquid crystal panel. Note that, ratios among length, width, and thickness of each member in FIGS. 1 and 2 are different from those of an actual member for clarity. A liquid crystal panel 100 includes a liquid crystal cell 10, a first polarizer 21 placed on one side of the liquid crystal cell 10, and a second polarizer 22 placed on the other side of the liquid crystal cell 10. A first O-plate 31 and a first biaxial retardation layer 41 are placed between the liquid crystal cell 10 and the first polarizer 21. The first biaxial retardation layer 41 is placed between the liquid crystal cell 10 and the first O-plate 31. A second O-plate 32 and a second biaxial retardation layer 42 are placed between the liquid crystal cell 10 and the second polarizer 22. The second biaxial retardation layer 42 is placed between the liquid crystal cell 10 and the second O-plate 32.

The above first and second O-plates are typically a solidified layer or a cured layer of a bar-shaped liquid crystal compound arranged in a hybrid alignment. Further, a tilt angle ($\theta_P$) of the above bar-shaped liquid crystal compound on the polarizer side is larger than a tilt angle ($\theta_B$) thereof on the biaxial retardation layer side. The O-plate will be described in detail in section D shown later.

A liquid crystal panel with such a configuration can prevent light leakage from a backlight in front and oblique directions in the case where a black image is displayed on a screen of a liquid crystal display apparatus. Consequently, a contrast ratio in an oblique direction can be enhanced, and in particular, a liquid crystal display apparatus can be obtained in which a contrast ratio is remarkably high in the case where a screen is viewed in an oblique direction from a vertical azimuth of the display apparatus. Further, the liquid crystal panel of the present invention exhibits particularly excellent effects on the optical compensation of a liquid crystal cell provided with a liquid crystal layer including a region where liquid crystal molecules are aligned so as to be inclined.

Practically, on a side of the first and/or second polarizer which is opposite to a side having the above O-plate, any protective layer and surface treatment layer can be placed. Further, any adhesion layer can be provided between constituent members of the above liquid crystal panel. The "adhesion layer" refers to a layer that connects surfaces of adjacent members and integrates them with a practically sufficient adhesive strength and for practically sufficient amount of adhesion time. Examples of the material for forming the above adhesion layer include an adhesive, a pressure-sensitive adhesive, and an anchor coat agent. The above adhesion layer may have a multi-layered configuration in which an anchor coat agent is formed on the surface of an adherend, and an adhesion layer or a pressure-sensitive adhesion layer is formed thereon. The above adhesion layer may also be a thin layer (also referred to as a hair line) that cannot be recognized with naked eyes. Hereinafter, the constituent members of the present invention will be described in detail, but the present invention is not limited to the following particular embodiments.

B. Liquid Crystal Cell

Referring to FIG. 1, the above liquid crystal cell 10 includes a liquid crystal layer 13, a first substrate 11 placed on the first polarizer 21 side of the liquid crystal layer 13, and a second substrate 12 placed on the second polarizer 22 side of the liquid crystal layer 13. On one substrate (active matrix substrate), preferably, switching elements (typically, TFTs) controlling the electrooptical properties of liquid crystal, and scanning lines providing the switching elements with a gate signal and signal lines providing the switching elements with a source signal (none of them are shown) are provided. On the other substrate (color filter substrate), a color filter is provided. The color filter may be provided on the active matrix substrate. Alternatively, for example, in the case where a 3-color light source of RGB (which may further include a multicolor light source) is used as illumination means of a liquid crystal display apparatus as in a field sequential system, the above color filter can be omitted. The interval (cell gap) between two substrates is controlled with spacers (not shown).

The above first substrate and the above second substrate each have an alignment film on the liquid crystal layer 13 side. In one embodiment, the alignment film has its surface subjected to alignment treatment. As the above alignment treatment, any method can be adopted as long as liquid crystal molecules are arranged in a constant alignment state on the surface of a substrate. As the above alignment treatment, preferably, a rubbing method is used in which a polymer film made of polyimide or the like is applied, and the polymer film is rubbed in one direction with a fiber such as nylon or polyester. The direction of the above alignment treatment is a rubbing direction in the case where a rubbing method is used as alignment treatment, for example.

The liquid crystal layer preferably includes liquid crystal molecules arranged in a twist alignment in the absence of an electric field. The twist alignment generally refers to an alignment in which liquid crystal molecules in a liquid crystal layer are arranged substantially in parallel to both the substrate surfaces, and the arrangement direction thereof is twisted at a predetermined angle (e.g., 90° or 270°) on both the substrate surfaces. Typical examples of the liquid crystal cell having a liquid crystal layer in such an alignment state include a liquid crystal cell of a twisted nematic (TN) mode or a supertwisted nematic (STN) mode. In the present invention, the liquid crystal cell of a TN mode is preferred. This is because the properties of each constituent member used in the present invention are exhibited synergistically, and very excellent optical compensation can be realized. For example, as the liquid crystal cell of a TN mode, a liquid crystal cell to be mounted on a commercially available liquid crystal display apparatus can be used as it is. Examples of commercially available liquid crystal display apparatuses adopting a TN mode include a 17-inch liquid crystal monitor "FP71E+" (trade name) manufactured by BENQ Corporation and 15-inch liquid crystal monitor "1503FP" (trade name) manufactured by Dell Inc.

C. Polarizer

In this specification, the "polarizer" refers to an element capable of converting natural light or polarized light into any polarized light. Although not particularly limited, the polarizer used in the present invention preferably converts natural light or polarized light into linearly polarized light. When incident light is split into two perpendicular polarization components, such a polarizer has a function of transmitting one of the polarization components and has at least one function selected from the functions of absorbing, reflecting, and scattering the other polarization component.

As the first and second polarizers used in the present invention, any appropriate polarizers can be selected as long as they can achieve the object of the present invention. The first and second polarizers may be the same or different. For example, each of the above polarizers may be a single layer or a multi-layered polarizing film, or a laminate (so-called polarizing plate) including a substrate and a polarizing film, or in which a polarizing film is sandwiched between at least two substrates via any adhesion layer. The thickness of each of the polarizers is generally 5 μm to 100 μm. As each of the polarizers, a commercially available polarizing plate can be used as it is. Examples of the commercially available polarizing plate include "NPF SEG1425DU" (trade name) and "NPF SIG1423DU" (trade name) both manufactured by Nitto Denko Corporation.

An absorption axis of the above first polarizer and an absorption axis of the above second polarizer typically have a substantially perpendicular or parallel relation. For example, in a normally white liquid crystal display apparatus, the absorption axes are substantially parallel to each other, and in a normally black liquid crystal display apparatus, the absorption axes are substantially perpendicular to each other. Preferably, the absorption axis of the above first polarizer is substantially perpendicular to that of the above second polarizer (that is, it is preferred to employ a normally white liquid crystal display apparatus). In this specification, "substantially perpendicular" includes the case where an angle formed by two optical axes is 90°±1°, preferably 90°+0.5°. Further, "substantially parallel" includes the case where an angle formed by two optical axes is 0°±1°, preferably 0°±0.5°.

It is preferred that the above first and second polarizers have a light transmittance (also referred to as single axis transmittance) of 41% or more at a wavelength of 590 nm and a degree of polarization of 99.8% or more at a wavelength of 590 nm. Regarding the theoretical upper limit, the single axis transmittance is 50%, and the degree of polarization is 100%. By setting the signal axis transmittance and the degree of polarization under the above conditions, a liquid crystal display apparatus with a high contrast ratio in a front direction can be obtained.

D. O-plate

Figure 3:
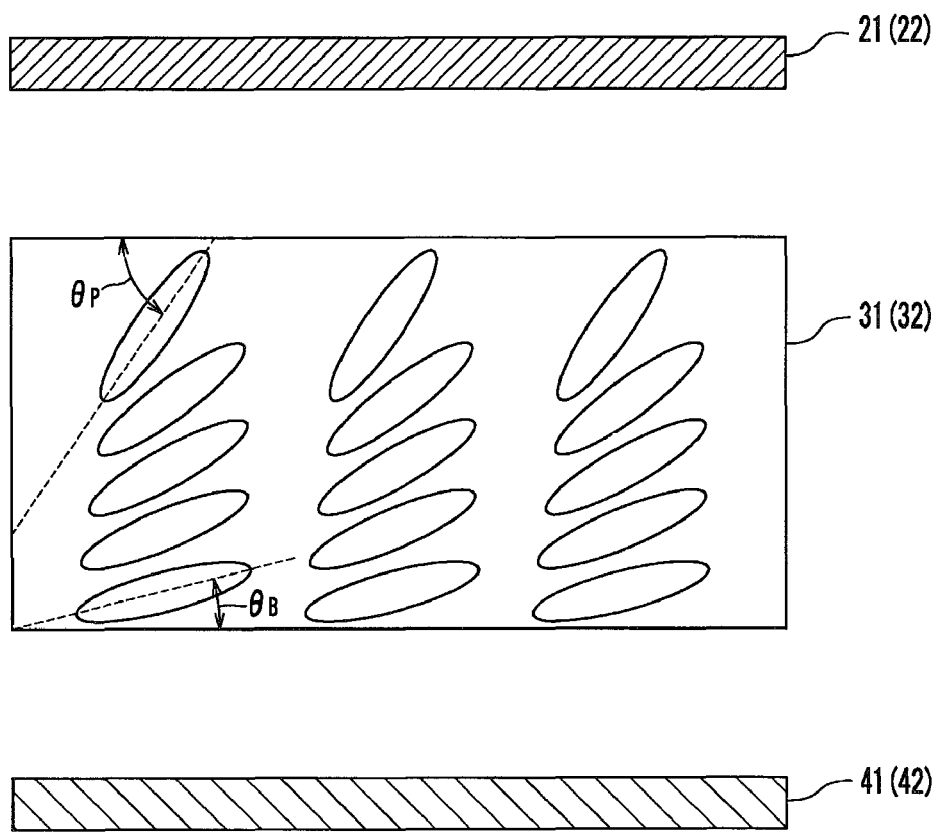
FIG. 3 Schematic view illustrating typical alignment state of bar-shaped liquid crystal molecules in a hybrid alignment.

In this specification, the "O-plate" refers to a retardation layer in which molecules are arranged in an inclination alignment. In the present invention, the first and second O-plates are a solidified layer or a cured layer (i.e., a retardation layer) of a bar-shaped liquid crystal compound in a hybrid alignment as described above. In this specification, the "hybrid alignment" refers to a state in which the inclination angle (tile angle) of the bar-shaped liquid crystal compound increases or decreases continuously or intermittently in a thickness direction, and a tilt angle ($\theta_P$) on the polarizer side is different from a tilt angle ($\theta_B$) on the biaxial retardation layer side. Herein, the tilt angle (θ) represents an angle formed by the adjacent layer surface and the bar-shaped liquid crystal compound, and is assumed to be 0° in the case where the molecules are aligned in parallel in a plane. FIG. 3 schematically shows a typical alignment state of bar-shaped liquid crystal compound molecules in a hybrid alignment. The above first O-plate and the above second O-plate may be the same or different. The thickness of the first and second O-plates is generally 0.1 μm to 10 μm, preferably 0.5 μm to 5 μm.

In the present invention, as shown in FIG. 3, the tilt angle ($\theta_P$) of the above bar-shaped liquid crystal compound on the polarizer side is larger than the tilt angle ($\theta_B$) thereof on the biaxial retardation layer side. A difference ($\Delta\theta=\theta_P-\theta_B$) between the tilt angle ($\theta_P$) of the bar-shaped liquid crystal compound on the polarizer side and the tilt angle ($\theta_B$) thereof on the biaxial retardation layer side is preferably 20° to 90°, more preferably 40° to 85°, and particularly preferably 60° to 80°.

The tilt angle ($\theta_P$) of the above bar-shaped liquid crystal compound on the polarizer side is preferably 20° to 90°, more preferably 40° to 85°, and particularly preferably 60° to 80°. The above tilt angle ($\theta_B$) on the biaxial retardation layer side is preferably 0° to 10°, and particularly preferably 0° to 5°.

The tilt angle of the bar-shaped liquid crystal compound with respect to an adjacent layer surface can be obtained by substituting previously measured $n_e$, $n_o$ and a retardation value (each value measured in 5° pitch at a polar angle of from −40° to +40° (a normal direction is assumed to be 0°) in a direction parallel to a slow axis) into Witte Equation described in Journal of Applied Physics Vol. 38 (1999) P. 748, as represented by the following Expressions (I) and (II). Herein, $\theta_{air}$ represents a tilt angle on one side (e.g., an air interface) of the bar-shaped liquid crystal compound, and $\theta_{AL}$ represents a tilt angle at an interface on the other side (e.g., a substrate or alignment film interface). d represents the thickness of a solidified layer or a cured layer of the bar-shaped liquid crystal compound arranged in a hybrid alignment. $n_e$ represents an extraordinary photorefractive index of the bar-shaped liquid crystal compound, and $n_o$ represents an ordinary photorefractive index of the bar-shaped liquid crystal compound.

[Expression 1]

$$R = \frac{d \cdot (n_e - n_o)}{\cos\alpha} \cdot \left[\frac{1}{2} + \frac{1}{4} \cdot \frac{\sin(2\Theta_{air} - 2\alpha) - \sin(2\Theta_{AL} - 2\alpha)}{\Theta_{air} - \Theta_{AL}}\right] \quad (I)$$

$$\alpha = \arcsin\left(\frac{\sin\phi}{n_o}\right) \quad (II)$$

Referring to FIG. 1, the first O-plate 31 is placed between the first polarizer 21 and the first biaxial retardation layer 41, and the second O-plate 32 is placed between the second polarizer 22 and the second biaxial retardation layer 42.

The slow axis of the first O-plate is preferably substantially parallel to the absorption axis of the first polarizer. The slow axis of the above second O-plate is substantially parallel to the absorption axis of the second polarizer. In this specification, the "slow axis" refers to a direction in which an in-plane refractive index becomes maximum. By the arrangement with such an axial relation, more appropriate optical compensation of a liquid crystal cell is conducted, and a liquid crystal display apparatus with a high contrast ratio in an oblique direction can be obtained.

The direction (also referred to as an alignment direction) in which the director direction of the above bar-shaped liquid crystal compound is projected onto a liquid crystal cell surface is substantially the same as the above alignment treatment direction of a liquid crystal cell. In this specification, the "director direction" means the alignment azimuth of the entire liquid crystal molecules considered statistically, and is also referred to as an average inclination angle ($\theta_{ave.}=(\theta_P+\theta_B)/2$). Herein, the $\theta_{ave.}$ represents an angle formed by the alignment direction and the biaxial retardation layer surface, and $\theta_{ave.}$ is assumed to be 0° in the case where the alignment direction is parallel in a plane. The above alignment direction is substantially parallel to the slow axis of the O-plate. Further, it is preferred that the above alignment direction be substantially parallel to the rubbing direction of an adjacent liquid crystal cell substrate.

The above average inclination angle ($\theta_{ave.}$) is preferably 10° to 45°, more preferably 15° to 42°, and particularly preferably 20° to 40°. By setting the average inclination angle in the above range, more suitable optical compensation of a liquid crystal cell is conducted, and a liquid crystal display apparatus with a high contrast ratio in an oblique direction can be obtained.

A light transmittance (T[590]) at a wavelength of 590 nm of the above first O-plate and/or second O-plate is preferably 85% or more, and more preferably 90% or more.

An in-plane retardation value (Re[590]) at a wavelength of 590 nm of the first O-plate and/or second O-plate is set to be a suitable value so as to be substantially equal to a retardation value of a liquid crystal cell at the time of black display (under voltage application), in the case where a liquid crystal display apparatus is in a normally white mode. The Re[590] of the first O-plate and/or second O-plate is preferably 50 nm to 200 nm, more preferably 70 nm to 180 nm, and particularly preferably 90 nm to 160 nm. By setting the in-plane retardation value in the above range, more suitable optical compensation of a liquid crystal cell is conducted, and a liquid crystal display apparatus with a high contrast ratio in an oblique direction can be obtained. In this specification, an in-plane retardation value (Re[λ]) refers to a retardation value at a wavelength of λ (nm) at 23° C. Re[λ] can be obtained by Re[λ]=(nx−ny)×d, when the thickness of a film is defined as d(nm).

In this specification, the "bar-shaped liquid crystal compound" refers to a compound that has a mesogenic group in a molecular structure, a refractive index in a major axis direction of the mesogenic group being larger than that in a minor axis direction, and that exhibits a liquid crystal phase with changes in temperature by heating or cooling, or through the action of a certain amount of a solvent. The "solidified layer" refers to a layer in a state in which a liquid crystal composition in a softened, melted, or solution state is cooled to be solidified, and the "cured layer" refers to a layer in a state in which a part or an entirety of a liquid crystal composition is cross-linked by heat, a catalyst, light, and/or a radiation to become insoluble and infusible or to become difficult to be solved and melted.

As the above bar-shaped liquid crystal compound, any appropriate one can be selected. Preferably, the bar-shaped liquid crystal compound is in a crystal or glass state at room temperature, and expresses a nematic liquid crystal phase when being subjected to a high temperature. The bar-shaped liquid crystal compound may exhibit a liquid crystal phase before being formed into a film, and may form a network structure, for example, by a cross-linking reaction and not exhibit a liquid crystal phase after being formed into a film. If a bar-shaped liquid crystal compound having the above properties is used, for example, a hybrid alignment is formed under the condition that the liquid crystal compound exhibits a liquid crystal phase, and thereafter the alignment state can be fixed by cooling or cross-linking.

The "mesogenic group" is a structural part required for forming a liquid crystal phase and generally includes a ring unit. Specific examples of the mesogenic group include a biphenyl group, a phenylbenzoate group, a phenylcyclohexane group, an azoxybenzene group, an azomethine group, an azobenzene group, a phenylpyrimidine group, a diphenylacetylene group, a diphenylbenzoate group, a bicyclohexane group, a cyclohexylbenzene group, and a terphenyl group. Note that the terminals of each of those ring units may have a substituent such as a cyano group, an alkyl group, an alkoxy group, or a halogen group, for example. Of those, for the mesogenic group including a ring unit, a mesogenic group having a biphenyl group or a phenylbenzoate group is preferably used.

The bar-shaped liquid crystal compound may be a polymer substance (polymer liquid crystals) having a mesogenic group on a main chain and/or a side chain, or may be a low molecular weight substance (low molecular weight liquid crystals) having a mesogenic group in a part of a molecular structure. The polymer liquid crystal can be cooled from a liquid crystalline state to fix the alignment state of molecules, so the polymer liquid crystal has a feature in that productivity of film formation is high. The low molecular weight liquid crystal has excellent alignment property, so the low molecular weight liquid crystal has a feature in that a retardation layer with high transparency is easily obtained.

The above bar-shaped liquid crystal compound preferably has at least one cross-linkable functional group in a part of a molecular structure. This is because the mechanical strength is increased by the cross-linking reaction, whereby a retardation layer having excellent durability can be obtained. Examples of the above cross-linkable functional group include an acryloyl group, a methacryloyl group, an epoxy group, and a vinyl ether group. As the bar-shaped liquid crystal compound, a commercially available one can be used as it is. Alternatively, another liquid crystal compound or any additive such as a polymerization initiator or a leveling agent may be added to a commercially available or synthesized bar-shaped liquid crystal compound to obtain a liquid crystal composition. Examples of the commercially available bar-shaped liquid crystal compound having a cross-linkable functional group include "Paliocolor LC242" (trade name) manufactured by BASF JAPAN Ltd. and "CB483" (trade name) manufactured by Huntsman International LLC.

As a method of aligning the above bar-shaped liquid crystal compound in a hybrid alignment, any appropriate alignment treatment method can be selected. In one embodiment, the above first and second O-plates can be produced by a production method including the following Steps $A_1$ to $E_1$.

($A_1$) Step of preparing two substrates, subjecting one substrate to a first alignment treatment, and subjecting the other substrate to a second alignment treatment (in which the first alignment treatment and the second alignment treatment are not the same).

($B_1$) Step of preparing an application liquid containing a bar-shaped liquid crystal compound and a solvent.

($C_1$) Step of sandwiching the application liquid containing a bar-shaped liquid crystal compound and a solvent between the two substrates with the sides subjected to the alignment treatments each placed inside to form a laminate.

($D_1$) Step of heating the laminate in a temperature range (liquid crystal temperature range) in which the bar-shaped liquid crystal compound exhibits a liquid crystalline state.

($E_1$) Step of cooling the laminate to a temperature below the liquid crystal temperature range.

Herein, the first and second alignment treatments are each independently a vertical alignment treatment, a horizontal alignment treatment, or an inclined alignment treatment.

In another embodiment, the first and second O-plates can be produced by a production method including the following steps $A_2$ to $E_2$.

($A_2$) Step of subjecting a substrate to an alignment treatment.

($B_2$) Step of preparing an application liquid containing a bar-shaped liquid crystal compound and a solvent.

($C_2$) Step of applying the above application liquid to the surface of the substrate subjected to the alignment treatment to form a laminate.

($D_2$) Step of heating the laminate to a liquid crystal temperature range with an interface of the above application liquid on an opposite side of the substrate side in contact with air.

($E_2$) Step of cooling the laminate to a temperature below the liquid crystal temperature range.

Herein, the alignment treatment is a vertical alignment treatment, a horizontal alignment treatment, or an inclined alignment treatment. Which of these treatments to be selected can be appropriately determined depending upon the kind and chemical properties of a bar-shaped liquid crystal compound to be used.

In the liquid crystal panel of the present invention, the tilt angle ($\theta_P$) of the bar-shaped liquid crystal compound on the polarizer side and the tilt angle ($\theta_B$) thereof on the biaxial retardation layer side of the above first and second O-plates can be appropriately increased or decreased depending upon, for example, the conditions of the Steps $A_1$ to $E_1$ or the Steps $A_2$ to $E_2$, and the kind of a bar-shaped liquid crystal compound or a composition containing the bar-shaped liquid crystal compound.

As the above alignment treatment method, any suitable method can be adopted. Examples of the alignment treatment method include (A) a method of allowing an alignment agent to be absorbed to the surface of a substrate to form an alignment agent layer (also referred to as an alignment film), (B) a method of changing the shape of the surface of a substrate or an alignment film formed on the substrate, and (C) a method of irradiating the surface of the substrate or the alignment film formed on the substrate with light (also referred to as an optical alignment method). Among them, the optical alignment method is preferred. The optical alignment method is a process with much less generation of static electricity, dust, and dirt, and therefore, this method can provide a retardation layer having excellent quality. Further, the optical alignment method has a feature in that the tilt angle and slow axis direction of a bar-shaped liquid crystal compound in a retardation layer can be controlled appropriately.

An alignment agent for the above vertical alignment treatment is not particularly limited, and for example, lecithin, Bersamide 100, octadecyl malonic acid, organic silane, tetrafluoroethylene, polyimide, stearic acid, or the like can be used. An alignment agent for the above horizontal alignment treatment is not particularly limited, and for example, carbon, polyoxyethylene, Bersamide 125, polyvinyl alcohol, polyimide, a dibasic chromium carboxylate complex, organic silane, acetylene, dibasic aliphatic acid, crown ether, or the like can be used.

An alignment agent for the optical alignment method (a formed film is also referred to as an optical alignment film) preferably contains a compound having at least one photoreactive functional group in a molecular structure. As such an alignment agent, for example, an agent containing a compound having a photoreactive functional group that effects a photochemical reaction such as a photoisomerization reaction, a photocycloreversion/photocyclization reaction, a photodimerization reaction, a photolysis reaction, or a photo-Fries rearrangement. Examples of the photoreactive functional group that effects a photoisomerization reaction include an azobenzene group, a stilbene group, an α-hydrazono-β-ketoester group, a cinnamate group, a benzylidene phthalimidine group, and a retinoic acid. Examples of the photoreactive functional group that effects a photodimerization include a cinnamate group, a benzylidene phthalimidine group, a chalcone group, a coumarin group, a styrylpyridine group, and an anthracene group.

Regarding the conditions for irradiating the surface of the above optical alignment film with light, any suitable method can be selected depending upon the kind of a photochemical reaction of a compound having a photoreactive functional group used for the optical alignment film. As a light source used for light irradiation, there are given an ultra-high pressure mercury lamp, a flash UV lamp, a high-pressure mercury lamp, a low-pressure mercury lamp, a deep UV lamp, a xenon lamp, and a metal halide lamp. The wavelength of the light source is preferably 210 nm to 380 nm. Further, the irradiation light amount of this light is measured at a wavelength of 365 nm, and preferably is 5 mJ/cm$^2$ to 500 mJ/cm$^2$. In order to suppress the photolysis reaction of an optical alignment film, a region of 100 nm to 200 nm of the wavelength of the light source is preferably cut with a filter or the like. Under the above conditions, a bar-shaped liquid crystal compound can be aligned uniformly in a hybrid alignment.

As a method of preparing an application liquid containing the above bar-shaped liquid crystal compound and a solvent, any appropriate method can be adopted. Herein, the "application liquid" refers to a solution or a dispersion. Examples of the above solvent include acetone, methyl ethyl ketone, methyl isobutyl ketone, cyclohexanone, cyclopentanone, 2-pentanone, 2-hexanone, diethyl ether, tetrahydrofran, dioxane, anisol, ethyl acetate, butyl acetate, toluene, xylene, chloroform, dichloromethane, dichloroethane, dimethyl formamide, dimethyl acetamide, and methyl cellosolve. These solvents can be used alone or in combination. The concentration of the bar-shaped liquid crystal compound is preferably 5% by weight to 40% by weight.

As a method of applying the application liquid containing the bar liquid crystal compounds and solvent onto the substrate, an application method employing any appropriate coater may be used. Examples of the coater include a reverse roll coater, a positive rotation roll coater, a gravure coater, a knife coater, a rod coater, a slot die coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Preferable examples of the coater include a reverse roll coater, a positive rotation roll coater, a gravure coater, a rod coater, a slot die coater, a slot orifice coater, a curtain coater, and a fountain coater. In order to prevent changes in the concentration of the application liquid, it is preferred to use a coater head using a closed applicator for the coater. With the application method using the above coater, a solidified layer with a small variation in thickness can be obtained.

As a method of forming a solidified layer of the above bar-shaped liquid crystal compound arranged in the hybrid alignment, any appropriate method can be adopted. Examples of the above method of forming a solidifying method include a method including the above Steps $A_1$ to $E_1$ and a method including the above Steps $A_2$ to $E_2$. The heating temperature in the above Step $D_1$ or $D_2$ is preferably 30° C. or more and is equal to or less than a liquid crystal phase-isotropic phase transition temperature (Ti), and more preferably 30° C. to 120° C. Examples of the above heating means include a heating method or a temperature control method using an air-circulating thermostatic oven in which a hot blast or a cold blast circulates, a heater using a microwave or a far infrared radiation, a roll heated for adjusting a temperature, a heat pipe roll, a metal belt, or the like. The above heating time (drying time) is generally 1 minute to 20 minutes. The liquid crystal phase-isotropic phase transition temperature (Ti) can be determined by observing a sample of the above bar-shaped liquid crystal compound or a liquid crystalline composition containing the same with a polarizing microscope.

As a method of forming a cured layer of the above bar-shaped liquid crystal compound arranged in a hybrid alignment, any appropriate method can be selected. The method of forming a cured layer is preferably a cross-linking method using a bar-shaped liquid crystal compound (also referred to as a cross-likable bar-shaped liquid crystal compound) having at least one cross-linkable functional group in a part of a molecular structure, or a composition (also referred to as a cross-linkable composition) containing a cross-linkable compound and a bar-shaped liquid crystal compound. Specific examples of the cross-linking method include a method using heat and a method of irradiating an energy ray (e.g., visible light, a UV-ray, or a radiation). The cross-linking method is preferably a method of irradiating a UV-ray. This is because a cured layer having excellent alignment state can be obtained. In this case, the timing of irradiating the UV-ray is preferably after the formation of a solidified layer or in the course of solidification.

Regarding the conditions for curing the above bar-shaped liquid crystal compound in the method of irradiating a UV-ray, any appropriate method can be selected depending upon the kind of a photochemical reaction of a cross-linkable bar-shaped liquid crystal compound or a cross-linkable composition. As a light source used for the light irradiation, any light source can be selected appropriately from those exemplified for the above optical alignment method. The wavelength of the light source is preferably 210 nm to 380 nm. Further, as the irradiation light amount of this light, a value measured at a wavelength of 310 nm is preferably 30 mJ/cm$^2$ to 1,000 mJ/cm$^2$. In order to suppress the photolysis reaction of an optical alignment film and a bar-shaped liquid crystal compound, it is preferred that a region of 100 nm to 200 nm of the wavelength of the above light source be cut with a filter. Further, it is preferred that the surrounding atmosphere of a cross-linkable bar-shaped liquid crystal compound or a cross-linkable composition to be irradiated with light be replaced with inactive gas such as nitrogen. Under the above conditions, a cured layer having excellent thickness uniformity can be formed.

E. Biaxial Retardation Layer

In this specification, the "biaxial retardation layer" refers to a layer in which a refractive index ellipsoid satisfies a relationship: nx>ny>nz. Herein, nx represents a refractive index in a slow axis direction, ny represents a refractive index in a direction (also referred to as a fast axis direction) perpendicular to the slow axis in the same plane, and nz represents a refractive index in a thickness direction. Such a biaxial retardation layer satisfies 10 nm<Re[590]<Rth[590].

The above first biaxial retardation layer and the above second biaxial retardation layer may be the same or different. The first and second biaxial retardation layers may be a single layer or a multi-layered retardation layer, or a laminate including a substrate and a retardation layer. Alternatively, the above biaxial retardation layer may also function as a substrate of the above O-plate. In the case where the biaxial retardation layer also functions as a substrate of the above O-plate, one surface of the biaxial retardation layer may be subjected to an alignment treatment so as to align a bar-shaped liquid crystal compound, or may have an alignment film. The thicknesses of the above-mentioned first and second biaxial retardation layers are each generally 0.5 µm to 100 µm.

Referring to FIG. 1, the first biaxial retardation layer 41 is placed between the first O-plate 31 and the first substrate 11, and the second biaxial retardation layer 42 is placed between the second O-plate 32 and the second substrate 12.

Referring to FIG. 2, a preferred embodiment of the above first and second biaxial optical elements will be described. A slow axis 5 of the first biaxial retardation layer 41 is substantially perpendicular to an absorption axis 3 of the first polarizer 21, and a slow axis 6 of the second biaxial retardation layer 42 is substantially perpendicular to an absorption axis 4 of the second polarizer 22. The slow axis 5 of the first biaxial retardation layer 41 is substantially perpendicular to the slow axis 6 of the second biaxial retardation layer 42. The slow axis 5 of the first biaxial retardation layer 41 is substantially perpendicular to a rubbing direction 1 of the first substrate 11, and the slow axis 6 of the second biaxial retardation layer 41 is substantially perpendicular to a rubbing direction 2 of the second substrate 12. With the arrangement in such an axial relationship, more suitable optical compensation of a liquid crystal cell is performed, and a liquid crystal display apparatus with a high contrast ratio in an oblique direction can be obtained.

A light transmittance (T[590]) at a wavelength of 590 nm of the above first biaxial retardation layer and/or the above second biaxial retardation layer is preferably 85% or more, and more preferably 90% or more.

An in-plane retardation value (Re[590]) at a wavelength of 590 nm of the first biaxial retardation layer and/or the second biaxial retardation layer is preferably 50 nm to 200 nm, more preferably 80 nm to 180 nm, and particularly preferably 100 nm to 160 nm.

A difference ($Re[590]_{B1}$–$Re[590]_{O1}$) between $Re[590]_{B1}$ of the above first biaxial retardation layer and $Re[590]_{O1}$ of the above first O-plate is preferably 0 nm to 60 nm, and more preferably 10 nm to 50 nm. A difference ($Re[590]_{B2}$–$Re[590]_{O2}$) between $Re[590]_{B2}$ of the above second biaxial retardation layer and $Re[590]_{O2}$ of the above second O-plate is preferably 0 nm to 60 nm, and more preferably 10 nm to 50 nm. By setting the in-plane retardation value in the above range, more suitable optical compensation of a liquid crystal cell is performed, and a liquid crystal display apparatus with a high contrast ratio in an oblique direction can be obtained.

A thickness direction retardation value (Rth[590]) at a wavelength of 590 nm of the above first biaxial retardation layer and/or the above second biaxial retardation layer is preferably 80 nm to 360 nm, more preferably 100 nm to 320 nm, and particularly preferably 120 nm to 280 nm in a range where a refractive index ellipsoid satisfies a relationship: nx>ny>nz. In this specification, the thickness direction retardation value (Rth[λ]) refers to a thickness direction retardation value at a wavelength λ (nm) at 23° C. Rth[λ] can be obtained by Rth[λ]=(nx−nz)×d, when the thickness of a film is defined as d(nm). By setting the thickness direction retardation value in the above range, more suitable optical compensation of a liquid crystal cell is performed, and a liquid crystal display apparatus with a high contrast ratio in an oblique direction can be obtained.

An Nz coefficient of the above first biaxial retardation layer and/or the above second biaxial retardation layer is preferably 1.1 to 6.0, more preferably 1.1 to 4.0, and particularly preferably 1.2 to 2.0. The above Nz coefficient is obtained by Equation: Nz=Rth[590]/Re[590]. By setting the Nz coefficient in the above range, more suitable optical compensation of a liquid crystal cell is performed, and a liquid crystal display apparatus with a high contrast ratio in an oblique direction can be obtained.

As a material for forming the first and/or the second biaxial retardation layer(s), any suitable material can be selected as long as it satisfies the above optical properties. Preferably, the first and/or second biaxial retardation layer(s) include(s) a retardation film containing a thermoplastic resin. Examples of the thermoplastic resin include, although not particularly limited to, norbornene-based resin, cellulose-based resin, polyamide-based resin, polycarbonate-based resin, polysulfone-based resin, polyethersulfone-based resin, polyether ether ketone-based resin, polyarylate-based resin, polyamideimide-based resin, and polyimide-based resin. The above thermoplastic resin is used alone or in a combination.

Preferably, the above first and/or second biaxial retardation layer(s) include(s) a retardation film containing norbornene-based resin. In this specification, the "norbornene-based resin" refers to a (co)polymer obtained by using a norbornene-based monomer having a norbornene ring in a part or an entirety of a starting material (monomer). The above "(co) polymer" represents a homopolymer or a copolymer. The above retardation film is generally produced by stretching a polymer film which has been formed from the above resin into a sheet shape.

As the norbornene-based resin, a norbornene-based monomer having a norbornene ring (having a double bond in a norbornane ring) as a starting material is used. The above norbornene-based resin may or may not have a norbornane ring in a constituent unit in a (co)polymer state. The norbornene-based resin having a norbornane ring in a constituent unit in a (co)polymer state is obtained using, for example, a monomer such as tetracyclo[$4.4.1^{2,5}.1^{7,10}$.0]deca-3-en, 8-methyltetracyclo[$4.4.1^{2,5}.1^{7,10}$.0]deca-3-en, or 8-methoxycarbonyltetracyclo[$4.4.1^{2,5}.1^{7,10}$.0]deca-3-en. The norbornene-based resin having no norbornane ring in a constituent unit in a (co)polymer state is obtained using, for example, a monomer that becomes a 5-membered ring by cleavage. Examples of the above monomer that becomes a 5-membered ring by cleavage include norbornene, dicyclopentadiene, 5-phenylnorbornene, and derivatives thereof. In the case where the above norbornene-based resin is a copolymer, the arrangement state of the molecules thereof is not particularly limited, and the copolymer may be a random copolymer, a block copolymer, or a graft copolymer.

Examples of the above norbornene-based resin include (A) a resin obtained through hydrogenation of a ring-opened (co) polymer of a norbornene-based monomer, and (B) a resin obtained through addition (co)polymerization of a norbornene-based monomer. The ring-opened copolymer of a norbornene-based monomer includes a resin obtained through hydrogenation of a ring-opened copolymer of at least one norbornene-based monomer and α-olefins, cycloalkenes, and/or non-conjugate dienes. The above resin obtained through addition (co) polymerization of a norbornene-based monomer includes a resin obtained through addition (co) polymerization of at least one norbornene-based monomer and α-olefins, cycloalkenes, and/or non-conjugate dienes.

The above resin obtained through hydrogenation of a ring-opened (co)polymer of a norbornene-based monomer can be obtained by subjecting a norbornene-based monomer or the like to a metathesis reaction to obtain a ring-opened (co) polymer, and further by hydrogenating the ring-opened (co) polymer. Specific examples include a method described in paragraphs [0059] to [0060] in JP 11-116780 A, and a method described in paragraphs [0035] to [0037] of JP2001-350017A. The above resin obtained through addition (co)

polymerization of the norbornene-based monomer can be obtained by, for example, the method described in Example 1 of JP 61-292601 A.

Regarding the weight average molecular weight (Mw) of the above norbornene-based resin, the value measured by a gel permeation chromatograph (GPC) with a tetrahydrofuran solvent is preferably 20,000 to 500,000. The glass transition temperature (Tg) of the above norbornene-based resin is preferably 120° C. to 170° C. With such a resin, it is possible to obtain a polymer film which has excellent heat stability and in which an in-plane and thickness direction retardation value is easy to control by stretching. The glass transition temperature (Tg) is a value calculated by the DSC method pursuant to JIS K 7121.

As a method of obtaining the above polymer film containing a norbornene-based resin, any suitable forming method can be adopted. Preferably, the above forming method is a solvent casting method or a melt extrusion method. This is because a polymer film having excellent smoothness and optical uniformity can be obtained.

The above polymer film containing a norbornene-based resin can further contain any suitable additives. Examples of the above additive include a plasticizer, a heat stabilizer, a light stabilizer, a lubricant, an antioxidant, a UV-absorber, a flame retardant, a colorant, an antistatic agent, a compatibilizer, a cross-linking agent, and a thickener. The content of the above additive is preferably more than 0 part by weight and equal to or less than 10 parts by weight, with respect to 100 parts by weight of the above norbornene-based resin.

As the polymer film containing a norbornene-based resin, a commercially available film can be used as it is. Alternatively, a commercially available film subjected to a secondary treatment such as stretching and/or shrinking can be used. Examples of the commercially available polymer film containing a norbornene-based resin include Arton series (trade name: ARTON F, ARTON FX, and ARTON D) manufactured by JSR Corporation, and Zeonor series (trade name: ZEONOR ZF14 and ZEONOR ZF16) manufactured by OPTES Inc.

As a method of stretching the above polymer film, any suitable stretching method can be adopted depending upon the purpose. Examples of the stretching method include a longitudinal uniaxial stretching method, a transverse uniaxial stretching method, a simultaneous longitudinal and transverse biaxial stretching method, and a sequential longitudinal and transverse biaxial stretching method. As means for stretching the above polymer film, any suitable stretching machine such as a roll stretching machine, a tenter stretching machine, or a biaxial stretching machine can be used. Preferably, the above stretching machine includes temperature control means. In the case where the polymer film is stretched together with heating, the internal temperature of the stretching machine may be changed continuously or changed in stepwise. The stretching step may be performed once or may be divided into twice or more. The stretching direction may be a longitudinal direction (MD direction) of a film or a width direction (TD direction) thereof. Further, the polymer film may be stretched (obliquely stretched) in an oblique direction using a stretching method described in FIG. 1 of JP 2003-262721 A.

The temperature (stretching temperature) for stretching the above polymer film can be set appropriately depending upon the purpose. Preferably, the stretching is performed in a range of Tg+1° C. to Tg+30° C. with respect to the glass transition temperature (Tg) of the polymer film. By selecting such a condition, a retardation value is likely to be uniform, and a retardation film is unlikely to be crystallized (whitish). The stretching temperature is preferably 100° C. to 180° C., and more preferably 120° C. to 160° C. Examples of the means for controlling the stretching temperature include an air-circulating thermostatic oven in which a hot blast or a cold blast circulates, a heater using a microwave or a far infrared radiation, a roll heated for adjusting a temperature, a heat pipe roll, a metal belt, and the like. The glass transition temperature can be determined by the DSC method pursuant to JIS K 7121 (1987).

The ratio for stretching the above polymer film (stretching ratio) can be selected appropriately depending upon the intended retardation value. The above stretching ratio is preferably more than 1 to 4 or less, more preferably more than 1 to 3.5 or less, and particularly preferably more than 1 to 3 or less. The feed speed during stretching is, although not particularly limited to, preferably 0.5 m/min. to 30 m/min. in terms of the mechanical precision, stability, and the like. Under the above stretching conditions, the intended retardation value can be obtained, and a retardation film having excellent uniformity can be obtained.

F. Liquid Crystal Display Apparatus

The liquid crystal display apparatus of the present invention includes the above liquid crystal panel. The liquid crystal display apparatus of the present invention may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type.

Figure 4:
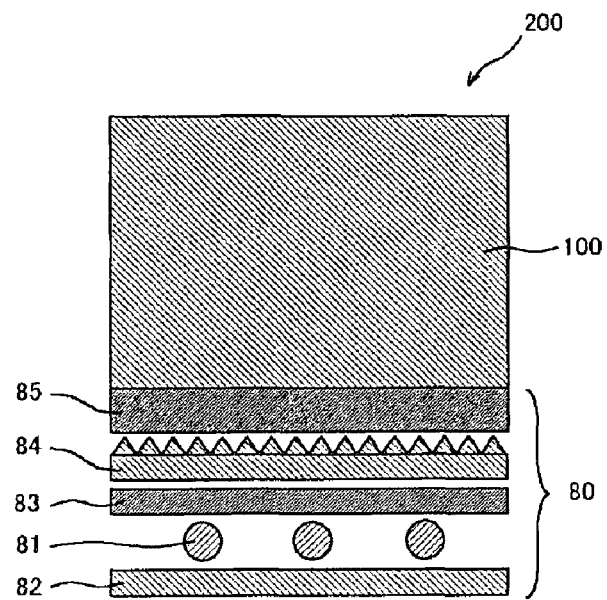
FIG. 4 Schematic cross-sectional view of a liquid crystal display apparatus according to a preferred embodiment of the present invention.

As an example of the liquid crystal display apparatus of the present invention, a transmissive type liquid crystal display apparatus will be described. FIG. 4 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 4 is different from the actual one. A liquid crystal display apparatus 200 at least includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, a prism sheet 84, and a brightness enhancing film 85. In the case where the sidelight-type is adopted, the backlight unit preferably further includes at least a light guide plate and a light reflector, in addition to the above configuration. As long as the effects of the present invention are obtained, a part of the optical member illustrated in FIG. 4 may be omitted or may be replaced by another optical element, depending upon the application such as an illumination system of a liquid crystal display apparatus and a driving mode of a liquid crystal cell.

In the liquid crystal display apparatus of the present invention, the average value of the contrast ratio at a polar angle of 40° and an omniazimuth (0° to 360°) is preferably 60 or more, and more preferably 70 to 150. Further, the maximum value of the contrast ratio at a polar angle of 40° and an omniazimuth (0° to 360°) is preferably 160 or more, and more preferably 170 to 250. In addition, the minimum value of the contrast ratio at a polar angle of 40° and an omniazimuth (0° to 360°) is preferably 20 or more, and more preferably 25 to 55. The liquid crystal display apparatus of the present invention has dramatically improved display properties compared to conventional liquid crystal display apparatus.

G. Application

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

Preferably, the liquid crystal display apparatus of the present invention is applied to a television. The screen size of the television is preferably wide 17-type (373 mm×224 mm) or more, more preferably wide 23-type (499 mm×300 mm) or more, and particularly preferably wide 32-type (687 mm×412 mm) or more.

The present invention will be described in more detail by using the following examples. However, the present invention is not limited to the examples. Analytical methods used in the examples are described below.

(1) Method of Measuring a Tilt Angle at an Interface of a Bar-Shaped Liquid Crystal Compound The tilt angle at an interface of a bar-shaped liquid crystal compound was obtained by substituting $n_e$, $n_o$ and a retardation value (each value measured in 5° pitch at a polar angle of from −40° to +40° (a normal direction is assumed to be 0°) in a direction parallel to a slow axis) into the Witte equation described in Journal of Applied Physics Vol. 38 (1999), p. 748. As the retardation value, a value measured at a wavelength of 590 nm and 23° C., using a spectroscopic ellipsometer ("M-220" (trade name) manufactured by JASCO Corporation) was used. Further, for $n_e$ and $n_o$, values measured using an Abbe refractometer ("DR-M4" (trade name) produced by ATAGO Co., Ltd.) were used.

(2) Method of Measuring Single Axis Transmittance of Polarizer:

The single axis transmittance was measured by using a spectrophotometer "DOT-3" (trade name, manufactured by Murakami Color Research Laboratory), to obtain Y value through color correction by a two-degree field of view (C source) in accordance with JIS Z8701-1982.

(3) Method of Measuring Degree of Polarization of Polarizer:

The degree of polarization was determined by using a spectrophotometer "DOT-3" (trade name, manufactured by Murakami Color Research Laboratory) and by measuring a parallel light transmittance ($H_0$) and a perpendicular light transmittance ($H_{90}$) of the polarizer and using the following equation. Degree of polarization (%)=$\{(H_0-H_{90})/(H_0+H_{90})\}^{1/2} \times 100$. The parallel light transmittance ($H_0$) refers to a transmittance of a parallel laminate polarizer produced by piling two identical polarizers such that respective absorption axes are parallel to each other. The perpendicular light transmittance ($H_{90}$) refers to a transmittance of a perpendicular laminate polarizer produced by piling two identical polarizers such that respective absorption axes are perpendicular to each other. The light transmittance refers to a Y value obtained through color correction by a two-degree field of view (C source) in accordance with JIS Z8701-1982.

(4) Method of Determining Retardation Values (Re[λ], Rth[λ]), Nz Coefficient and T[590]:

They were determined by using an automatic birefringence analyzer "KOBRA21-ADH" (trade name, manufactured by Oji Scientific Instruments) at 23° C. As an average refractive index, the measured value obtained by using an Abbe refractometer "DR-M4" (trade name, manufactured by Atago Co., Ltd.) was used.

(5) Method of Measuring Thickness:

In the case where a thickness was less than 10 μm, it was measured by using a thin film thickness spectrophotometer "Multichannel photodetector MCPD-2000" (trade name, manufactured by Otsuka Electronics Co., Ltd.). In the case where a thickness was 10 μm or more, it was measured by using a digital micrometer "KC-351C-type" (trade name, manufactured by Anritsu Corporation).

(6) Method of Determining Molecular Weight:

The molecular weight was calculated through gel permeation chromatography (GPC) by using polystyrene as a standard sample. To be specific, the molecular weight was determined under the following measurement conditions by using the following apparatus and instruments. The measurement sample was obtained by dissolving a polymer in tetrahydrofuran to prepare 0.1 wt % solution, standing the solution overnight, and filtering the solution with 0.45 μm membrane filter.

Analyzer: "HLC-8120GPC", manufactured by Tosoh Corporation

Column: TSKgel SuperHM-H/H4000/H3000/H2000

Column size: 6.0 mmI.D.×150 mm

Eluant: tetrahydrofuran

Flow rate: 0.6 ml/minute

Detector: RI

Column temperature: 40° C.

Injection amount: 20 μl (7) Method of Measuring Glass Transition Temperature (Tg):

The glass transition temperature was measured by using differential scanning calorimeter "DSC-6200" (trade name, manufactured by Seiko Instruments Inc.) and in accordance with JIS K7121-1987 (Method of measuring transition temperature of plastic). Specifically, 3 mg of the sample was heated (heating rate of 10° C./min.) under nitrogen atmosphere (gas flow rate of 80 ml/min.). The heating measurement was conducted twice and the data of the second heating measurement was employed. The calorimeter was subjected to temperature calibration by using a standard substance (indium).

(8) Method of Determining Contrast Ratio:

After backlight was turned on in a dark room at 23° C. for 30 minutes, measurement of a contrast ratio was performed by using the following method and measurement apparatus. A white image and a black image were displayed on a liquid crystal display apparatus, and Y values in an XYZ display system were measured by using "EZ Contrast 160D" (trade name, manufactured by ELDIM SA). A contrast ratio "YW/YB" was calculated from a Y value (YW) of the white image and a Y value (YB) of the black image. Note that, the azimuth angle of 0° refers to a longer side of the panel. The polar angle of 0° refers to a normal line direction of the display screen.

(9) Method of Measuring Color Shift (Chrominance: ΔE):

After backlight was turned on in a dark room at 23° C. for 30 minutes, measurement of color shift was performed by using the following method and measurement apparatus. A black image was displayed on a liquid crystal display apparatus, and brightness L* and color coordinates a* and b* defined in a CIE1976 L*a*b* color space were measured at an azimuth angle of 0 to 360° and a polar angle 60° by using "EZ Contrast 160D" (trade name, manufactured by ELDIM SA). A color shift in an oblique direction (chrominance: ΔE) was calculated from an expression: $\{(L^*)^2+(a^*)^2+(b^*)^2\}^{1/2}$.

Preparation of a Liquid Crystal Cell

Reference Example 1

A liquid crystal panel was taken out from a liquid crystal display apparatus (17-inch liquid crystal monitor (Type No. FP71+) manufactured by BENQ Corporation) including a liquid crystal cell in a TN mode, and all the optical films placed on upper and lower sides of the liquid crystal cell were removed, and (front and reverse) glass surfaces of the above liquid crystal cell were washed. A liquid crystal cell thus produced was set to be a liquid crystal cell A.

Preparation of First and Second Polarizers

Reference Example 2

A commercially available polarizing plate ("SIG1423DU" (trade name) manufactured by Nitto Denko Corporation) was used as it is. The polarizing plate includes a protective layer mainly containing triacetylcellulose on both sides of a polarizing film. The above protective layer of the polarizing film exhibits isotropy substantially, and has Re[590] of 0.5 nm and Rth[590] of 1.0 nm. The single axis transmittance of the above polarizing plate was 42.6% and the degree of polarization thereof was 99.99%. In an example described later, these two polarizing plates were set to be a polarizing plate A and a polarizing plate B, respectively (that is, those having the same properties were used for the first and second polarizers).

Production of First and Second O-Plates

Reference Example 3

An alignment agent ("ROF103" (tradename) manufactured by Rolic Ltd.) for an optical alignment film was applied (condition: one minute at 3,000 rpm) to the surface of a polymer film (manufactured by Nitto Denko Corporation, a thickness of 80 μm) which mainly contains triacetylcellulose and has been subjected to hard coat treatment, with a spin coater, and dried in an air-circulating thermostatic oven at 100° C. for 10 minutes, whereby an optical alignment film with a thickness of 70 nm was formed. Next, the optical alignment film was irradiated with a polarized UV-ray (irradiation amount: 100 mJ/cm$^2$) in an oblique direction of 140° with respect to a substrate plane, whereby the optical alignment film was subjected to inclined alignment treatment. Next, an application liquid (concentration: 20% by weight) containing a liquid crystalline composition ("ROP5101" (liquid crystal temperature range: 30° C. to 57° C.) (trade name) manufactured by Rolic Ltd.) containing a bar-shaped liquid crystal compound having two cross-linkable functional groups in a molecular structure and a polymerization initiator and cyclopentanone was prepared. Then, the application liquid was applied to the surface of the above optical alignment film, and heated to 50° C. while an interface on the opposite side of the application liquid with respect to a substrate side being in contact with air. The application liquid was held for 2 minutes at that temperature, whereby a solidified layer of the bar-shaped liquid crystal compound arranged in a hybrid alignment was formed. The solidified layer was irradiated with a UV-ray (irradiation amount: 500 mJ/cm$^2$: 365 nm) under a nitrogen atmosphere, whereby a cured layer with a thickness of 1.1 μm was formed on the substrate. The above cured layer had T[590] of 90%, Re[590] of 110 nm, a tilt angle ($\theta_{air}$) at an air interface of 0°, a tilt angle ($\theta_{AL}$) at a substrate interface of 70°, and an average inclination angle of 35°. In an example described later, these two cured layers were set to be a cured layer A and a cured layer B, respectively (that is, those having the same properties were used for the first and second O-plates).

Production of First and Second Biaxial Retardation Layers

Reference Example 4

A polymer film ("ZEONOR ZF14" (Tg=136° C.) (trade name) manufactured by OPTES Inc.) containing norbornene-based resin with a thickness of 100 μm was stretched 2.56-fold in a width direction of the film at 150° C. by a fixed-end transverse uniaxial stretching method, using a tenter stretching machine. The obtained retardation film had a thickness of 35 μm, a light transmittance of 92%, Re[590] of 120 nm, Rth[590] of 180 nm, and a Nz coefficient of 1.5. In an example described later, these two retardation films were set to be a retardation film A and a retardation film B, respectively (that is, those having the same properties were used for a first biaxial retardation layer and a second biaxial retardation layer).

Production of a Liquid Crystal Panel and a Liquid Crystal Display Apparatus

Example 1

On the viewer side surface of the liquid crystal cell A obtained in Reference Example 1, the retardation film A was laminated as a first biaxial retardation layer via an acrylic pressure-sensitive adhesive (thickness: 20 μm) so that an angle formed by a slow axis of the retardation film A and a longitudinal direction of the liquid crystal cell became 135°. Next, to the surface of the retardation film A, the cured layer A was transferred as a first O-plate via an acrylic pressure-sensitive adhesive (thickness: 20 μm) while a substrate was being removed so that an angle formed by the alignment direction of the cured layer A and a longitudinal direction of the liquid crystal cell became 45°. Next, on the surface of the above cured layer A, the polarizing plate A was laminated as a first polarizer via an acrylic pressure-sensitive adhesive (thickness: 20 μm) so that an angle formed by an absorption axis of the polarizing plate A and a longitudinal direction of the liquid crystal cell became 45°. At this time, a tilt angle ($\theta_P$) of the bar-shaped liquid crystal compound on the polarizer side in the above cured layer A is 70°, and a tilt angle ($\theta_B$) thereof on the biaxial retardation layer side is 0°. Further, the alignment direction of the above bar-shaped compound is substantially the same as the alignment treatment (rubbing) direction of the above liquid crystal cell. The slow axis of the above first O-plate is substantially parallel to the absorption axis of the above first polarizer. The slow axis of the first biaxial retardation layer is substantially perpendicular to the absorption axis of the above first polarizer.

Then, on the backlight side surface of the above liquid crystal cell A, the retardation film B was laminated as a second biaxial retardation layer via an acrylic pressure-sensitive adhesive (thickness: 20 μm) so that an angle formed by a slow axis of the retardation film B and a longitudinal direction of the liquid crystal cell became 45°. Next, to the surface of the retardation film B, the cured layer B was transferred as a second O-plate via an acrylic pressure-sensitive adhesive (thickness: 20 μm) while a substrate was being removed so that an angle formed by an alignment direction of the cured layer B and a longitudinal direction of the liquid crystal cell became 135°. Next, on the surface of the above cured layer B, the polarizing plate B was laminated as a second polarizer via an acrylic pressure-sensitive adhesive (thickness: 20 μm) so that an angle formed by an absorption axis of the polarizing plate B and a longitudinal direction of the liquid crystal cell became 135°. At this time, a tilt angle ($\theta_P$) of the bar-shaped liquid crystal compound on the polarizer side in the above cured layer B is 70°, and a tilt angle ($\theta_B$) thereof on the biaxial retardation layer side is 0°. Further, the alignment direction of the above bar-shaped compound is substantially the same as the alignment treatment (rubbing) direction of the above liquid crystal cell. The slow axis of the above second O-plate is substantially parallel to the absorption axis of the above second polarizer. The slow axis of the above second biaxial retardation layer is substantially perpendicular to the absorption axis of the above second polarizer. The absorption axis of the above first polarizer is substantially perpendicular to the absorption axis of the above second polarizer. The optical axis angle of each of the constituent members has a value obtained counterclockwise with the longitudinal direction of the liquid crystal cell being 0°.

Figure 5:
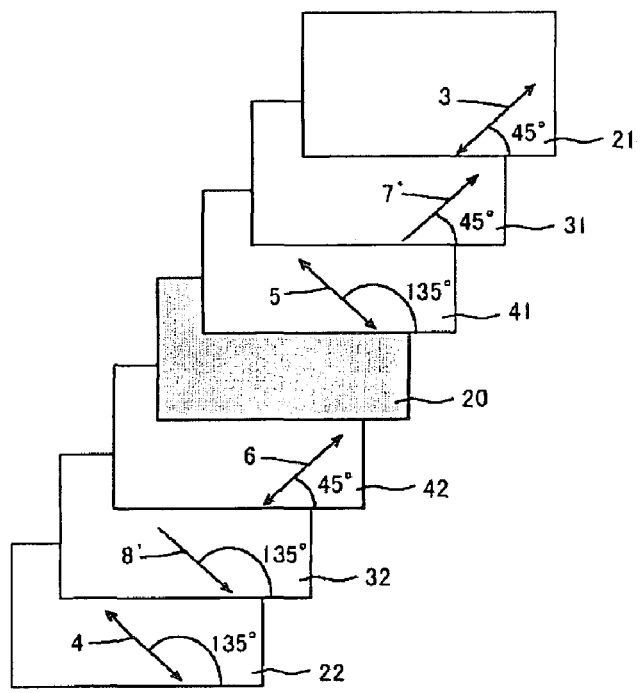
FIG. 5 Schematic view illustrating an optical axis relationship of respective layers in the liquid crystal panel of Example 1
Figure 6:
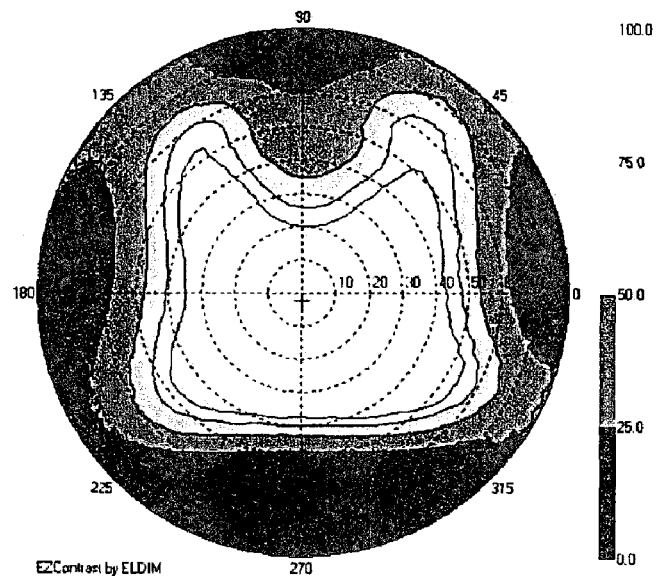
FIG. 6 Contour map showing a contrast ratio of a liquid crystal panel of Example 1.

The liquid crystal panel A thus produced was combined with a backlight unit of the original liquid crystal display apparatus to produce a liquid crystal display apparatus A. FIG. 5 is a schematic view showing an optical axis relationship of individual layers of the liquid crystal panel A. A light source of the backlight unit of the above liquid crystal display apparatus A was lit, and after the elapse of 30 minutes, a contrast ratio was measured. Table 1 shows the display properties of the liquid crystal display apparatus A. FIG. 6 is a contrast contour map of the above liquid crystal display apparatus A.

TABLE 1

| | Liquid crystal display apparatus | Contrast ratio in oblique direction (azimuth angle 0° to 360°, polar angle 40°) | | |
|---|---|---|---|---|
| | | Average value | Maximum value | Minimum value |
| Example 1 | A | 110.8 | 211.3 | 39.8 |
| Comparative Example 1 | H | 5.7 | 11.6 | 2.3 |
| Comparative Example 2 | I | 20.4 | 47.5 | 2.3 |
| Comparative Example 3 | J | 16.1 | 95.7 | 3.2 |
| Comparative Example 4 | K | 45.9 | 171.4 | 6.6 |

Comparative Example 1

Figure 7:
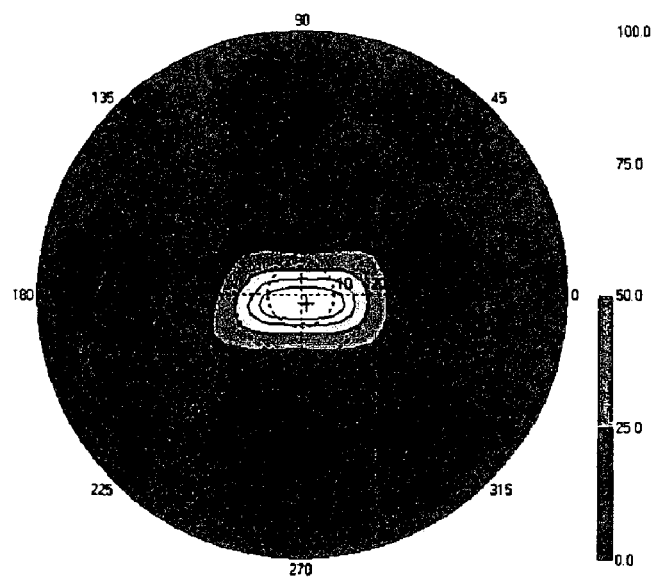
FIG. 7 Contour map showing a contrast ratio of a liquid crystal panel of Comparative Example 1.

A liquid crystal panel H and a liquid crystal display apparatus H were produced by the same method as that in Example 1, except that the first biaxial retardation layer and the second biaxial retardation layer were not used. The cured layers used as the first and second O-plates were transferred to the viewer side and the backlight side of the liquid crystal cell, respectively. Table 1 shows the display properties of the liquid crystal display apparatus H. FIG. 7 is a contrast contour map of the above liquid crystal display apparatus H.

Comparative Example 2

Figure 8:
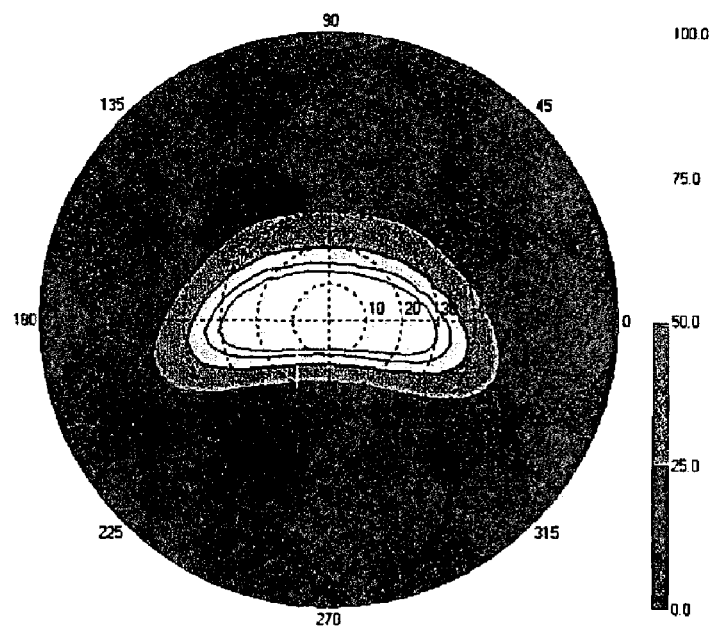
FIG. 8 Contour map showing a contrast ratio of a liquid crystal panel of Comparative Example 2.

A liquid crystal display panel I and a liquid crystal display apparatus I were produced by the same method as that in Example 1, except that the first O-plate and the second O-plate were not used. Table 1 shows the display properties of the liquid crystal display apparatus I. FIG. 8 shows a contrast contour map of the above liquid crystal display apparatus I.

Comparative Example 3

Figure 9:
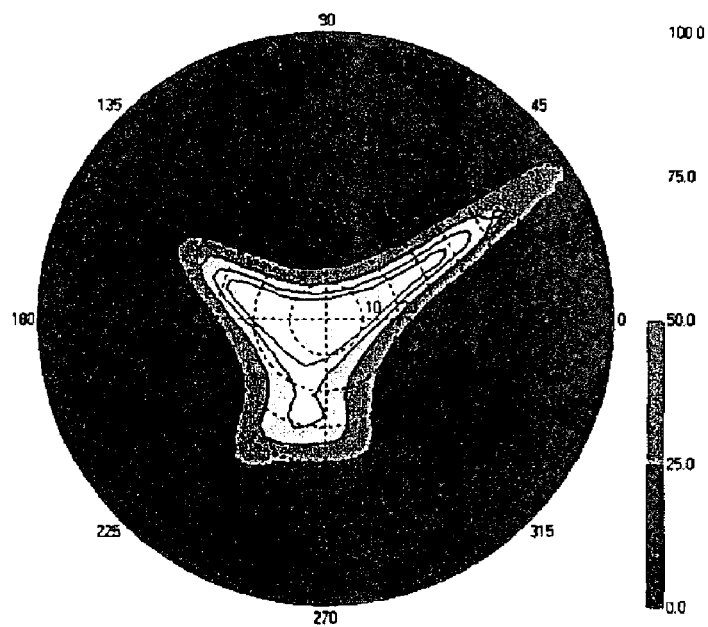
FIG. 9 Contour map showing a contrast ratio of a liquid crystal panel of Comparative Example 3.

A liquid crystal panel J and a liquid crystal display apparatus J were produced in the same way as in Example 1, except that the first biaxial retardation layer was placed between the first polarizer and the first O-plate, and the second biaxial retardation layer was placed between the second polarizer and the second O-plate. More specifically, the liquid crystal panel J and the liquid crystal display apparatus J were produced in the same way as in Example 1, except that the arrangement order of the biaxial retardation layer and the O-plate was reversed both on the upper and lower sides of the liquid crystal cell. Table 1 shows the display properties of the liquid crystal display apparatus J. FIG. 9 is a contrast contour map of the above liquid crystal display apparatus J.

Comparative Example 4

Figure 10:
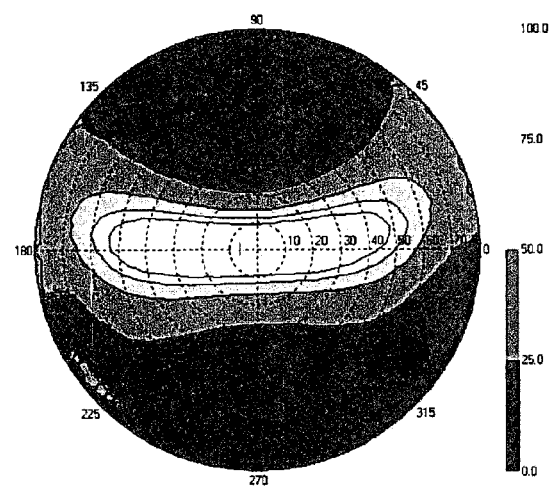
FIG. 10 Contour map showing a contrast ratio of a liquid crystal panel of Comparative Example 4.

A liquid crystal panel K and a liquid crystal display apparatus K were produced by the same method as that in Example 1, except that the first and second O-plates were laminated so that the tilt angle ($\theta_P$) of the bar-shaped liquid crystal compound on the polarizer side was 0° and the tilt angle ($\theta_B$) thereof on the biaxial retardation layer side was 70° in the cured layer B. That is, the inclination direction of the bar-shaped liquid crystal compound in the O-plate was reversed with respect to that in Example 1. Specifically, the cured layer A and the cured layer B were each transferred in advance to another substrate, and then transferred to the retardation films A and B. Table 1 shows the display properties of the liquid crystal display apparatus K. FIG. 10 is a contrast contour map of the above liquid crystal display apparatus K.

Evaluation

Figure 11:
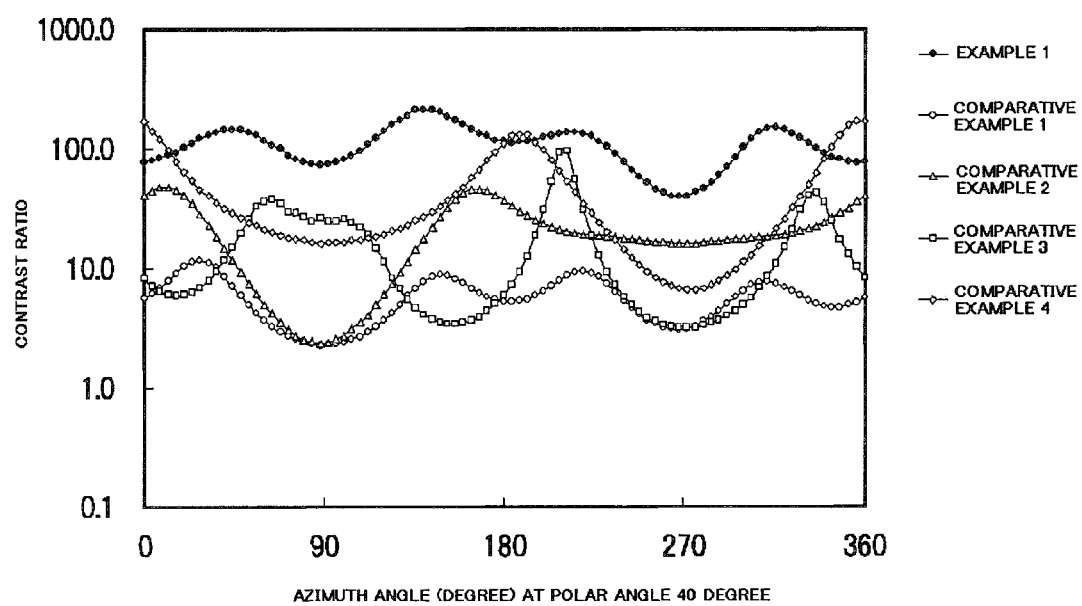
FIG. 11 Graph showing azimuth angle dependences of contrast ratios at a polar angle of 40° of the liquid crystal display apparatuses in Example 1 and Comparative Examples 1 to 4

FIG. 11 shows azimuth angle dependences of contrast ratios at a polar angle of 40° of the liquid crystal display apparatuses in Example 1 and Comparative Examples 1 to 4. As is apparent from FIG. 11, the liquid crystal display apparatus in Example 1 had a high contrast ratio in an oblique direction. Particularly, it is understood that the liquid crystal display apparatus had a very high contrast ratio when viewed obliquely from upper and lower azimuths (azimuth angles: 90° and 270° in FIG. 11) of the display apparatus, which was a conventional problem to be solved. On the other hand, the liquid crystal display apparatuses in Comparative Examples 1 to 3 had each a low contrast ratio when viewed from any azimuth in an oblique direction. Although the liquid crystal display apparatus in Comparative Example 4 had a high contrast ratio when viewed from right and left azimuths (azimuth angles: 0° and 180° in FIG. 11) of the display apparatus had a high contrast ratio, it had a large azimuth angle dependence of a contrast ratio, which gave uncomfortable feeling to a viewer. Further, the liquid crystal display apparatus in Comparative Example 4 had an insufficient contrast ratio when viewed obliquely from upper and lower azimuths of the display apparatus.

Figure 12:
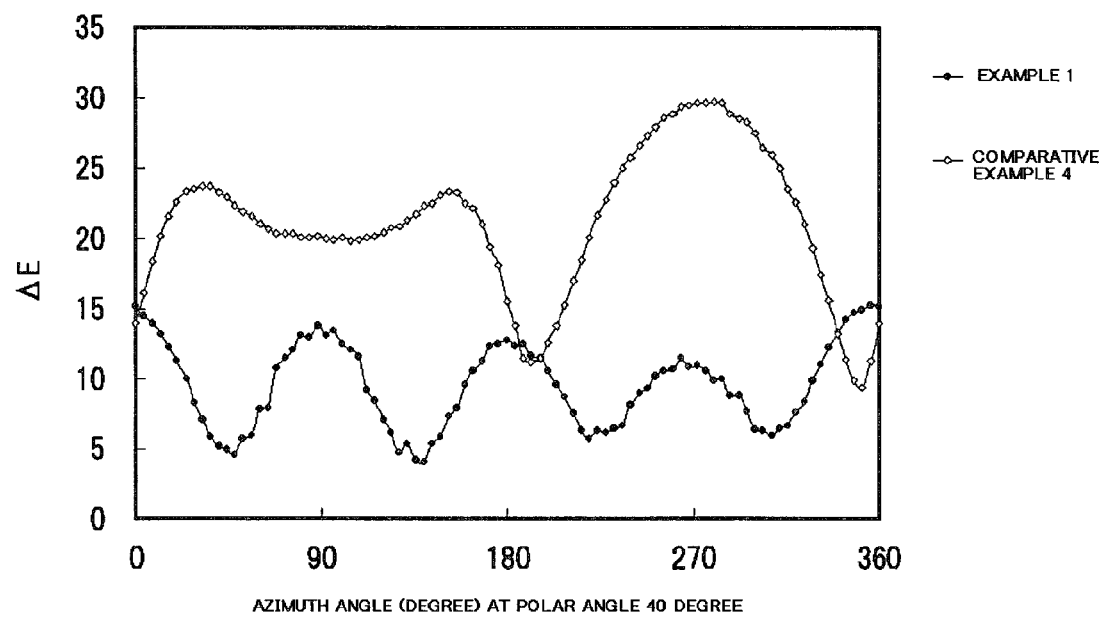
FIG. 12 Graph showing azimuth angle dependences of chrominances (ΔE) at a polar angle of 40° of the liquid crystal display apparatuses in Example 1 and Comparative Example 4.

FIG. 12 shows azimuth angle dependences of chrominances (ΔE) at a polar angle of 40° of the liquid crystal display apparatuses in Example 1 and Comparative Example 4. As is apparent from FIG. 12, the liquid crystal display apparatus in Example 1 had a small color shift amount (chrominance: ΔE) in an oblique direction. From this, it is understood that the liquid crystal display apparatus in Example 1 exhibits excellent display properties with a small change in color depending upon the viewing angle. As is apparent from the comparison between Example 1 and Comparative Example 4, it is understood that the arrangement order of the O-plates and the biaxial retardation layers is important for obtaining display properties with a small change in color depending upon the viewing angle.

INDUSTRIAL APPLICABILITY

As described above, the liquid crystal panel of the present invention is very useful, for example, for enhancing the display properties of the liquid crystal display apparatus.

The invention claimed is:

1. A liquid crystal panel, comprising:
a liquid crystal cell;
a first polarizer placed on one side of the liquid crystal cell;
a second polarizer placed on the other side of the liquid crystal cell;
a first O-plate placed between the liquid crystal cell and the first polarizer;
a second O-plate placed between the liquid crystal cell and the second polarizer;
a first biaxial retardation layer placed between the liquid crystal cell and the first O-plate; and
a second biaxial retardation layer placed between the liquid crystal cell and the second O-plate, wherein:
the first and the second O-plates are solidified layers or cured layers of a bar-shaped liquid crystal compound arranged in a hybrid alignment;
a tilt angle ($\theta_P$) of the bar-shaped liquid crystal compound on the polarizer side is larger than a tilt angle ($\theta_B$) thereof on the biaxial retardation layer side; and
an in-plane retardation value (Re[590]) at a wavelength of 590 nm of the first O-plate and/or the second O-plate is 50 nm to 200 nm.

2. A liquid crystal panel according to claim 1, wherein a difference ($\theta_P - \theta_B$) between the tilt angle ($\theta_P$) of the bar-shaped liquid crystal compound on the polarizer side and the tilt angle ($\theta_B$) thereof on the biaxial retardation layer side is 20° to 90°.

3. A liquid crystal panel according to claim 1, wherein the tilt angle ($\theta_P$) of the bar-shaped liquid crystal compound on the polarizer side is 20° to 90°.

4. A liquid crystal panel according to claim 1, wherein:
the liquid crystal cell includes a liquid crystal layer, a first substrate placed on the liquid crystal layer on the first polarizer side, and a second substrate placed on the liquid crystal layer on the second polarizer side; and
the first substrate and the second substrate respectively have an alignment film on the liquid crystal layer side.

5. A liquid crystal panel according to claim 4, wherein the liquid crystal layer contains liquid crystal molecules arranged in a twist alignment in the absence of an electric field.

6. A liquid crystal panel according to claim 1, wherein an absorption axis of the first polarizer is substantially perpendicular to an absorption axis of the second polarizer.

7. A liquid crystal panel according to claim 1, wherein a slow axis of the first O-plate is substantially parallel to the absorption axis of the first polarizer, and a slow axis of the second O-plate is substantially parallel to the absorption axis of the second polarizer.

8. A liquid crystal panel according to claim 1, wherein a direction in which a director direction of the bar-shaped liquid crystal compound is projected onto the liquid crystal cell surface is substantially the same as an alignment treatment direction of the liquid crystal cell.

9. A liquid crystal panel according to claim 1, wherein the slow axis of the first biaxial retardation layer is substantially perpendicular to the absorption axis of the first polarizer, and the slow axis of the second biaxial retardation layer is substantially perpendicular to the absorption axis of the second polarizer.

10. A liquid crystal panel according to claim 1, wherein an in-plane retardation value (Re[590]) at a wavelength of 590 nm of the first biaxial retardation layer and/or the second biaxial retardation layer is 50 nm to 200 nm.

11. A liquid crystal panel according to claim 1, wherein an Nz coefficient of the first biaxial retardation layer and/or the second biaxial retardation layer is 1.1 to 6.0.

12. A liquid crystal panel according to claim 1, wherein the first biaxial retardation layer and/or the second biaxial retardation layer includes a retardation film containing norbornene-based resin.

13. A liquid crystal display apparatus, comprising the liquid crystal panel according to claim 1.

* * * * *